United States Patent
Robinson et al.

(10) Patent No.: US 9,348,767 B2
(45) Date of Patent: *May 24, 2016

(54) ACCESSING PRIVATE DATA ABOUT THE STATE OF A DATA PROCESSING MACHINE FROM STORAGE THAT IS PUBLICLY ACCESSIBLE

(75) Inventors: Scott H. Robinson, Portland, OR (US); Gustavo P. Espinosa, Portland, OR (US); Steven M. Bennett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,176

(22) Filed: Mar. 6, 2012

(65) Prior Publication Data

US 2013/0067184 A1    Mar. 14, 2013

Related U.S. Application Data

(63) Continuation of application No. 10/724,321, filed on Nov. 26, 2003, now Pat. No. 8,156,343.

(51) Int. Cl.
*G06F 21/00* (2013.01)
*G06F 12/14* (2006.01)
*G06F 21/71* (2013.01)
*G06F 21/78* (2013.01)

(52) U.S. Cl.
CPC ............ *G06F 12/1408* (2013.01); *G06F 21/71* (2013.01); *G06F 21/78* (2013.01)

(58) Field of Classification Search
CPC ...... G06F 12/1408; G06F 21/86; G06F 21/72
See application file for complete search history.

(56) References Cited

U.S. PATENT DOCUMENTS

| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |

(Continued)

FOREIGN PATENT DOCUMENTS

| CN | 1309351 A | 8/2001 |
| DE | 4217444 A1 | 12/1992 |

(Continued)

OTHER PUBLICATIONS

Office Action Received for Chinese Patent Application No. 200480035019.4, mailed on Jan. 8, 2010, 6 pages of Chinese Office Action, and 8 pages of English Translation.

(Continued)

*Primary Examiner* — Fatoumata Traore
(74) *Attorney, Agent, or Firm* — Thomas R. Lane (57) ABSTRACT

According to an embodiment of the invention, a method for operating a data processing machine is described in which data about a state of the machine is written to a location in storage. The location is one that is accessible to software that may be written for the machine. The state data as written is encoded. This state data may be recovered from the storage according to a decoding process. Other embodiments are also described and claimed.

3 Claims, 6 Drawing Sheets

(56) References Cited

U.S. PATENT DOCUMENTS

| | | |
|---|---|---|
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,558,176 A | 12/1985 | Arnold et al. |
| 4,571,672 A | 2/1986 | Hatada et al. |
| 4,630,269 A | 12/1986 | Gershenson et al. |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard et al. |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,091,846 A | 2/1992 | Sachs et al. |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,655,125 A | 8/1997 | Cloud et al. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,860,028 A * | 1/1999 | Pecore ........................... 710/41 |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 5,987,572 A | 11/1999 | Weidner et al. |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |

(56) References Cited

U.S. PATENT DOCUMENTS

| | | | |
|---|---|---|---|
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams et al. | |
| 6,374,286 B1 | 4/2002 | Gee et al. | |
| 6,374,317 B1 | 4/2002 | Ajanovic et al. | |
| 6,378,068 B1 | 4/2002 | Foster et al. | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,779,114 B1 | 8/2004 | Chow et al. | |
| 6,986,028 B2 * | 1/2006 | Ehlig et al. | 712/241 |
| 6,986,052 B1 * | 1/2006 | Mittal | 713/190 |
| 6,996,725 B2 | 2/2006 | Ma et al. | |
| 7,149,878 B1 | 12/2006 | Jensen et al. | |
| 7,302,516 B2 | 11/2007 | Hanaki | |
| 7,523,111 B2 * | 4/2009 | Walmsley | |
| 2001/0018736 A1 * | 8/2001 | Hashimoto et al. | 713/1 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0055928 A1 | 3/2003 | Machida | |
| 2003/0061385 A1 | 3/2003 | Gonze | |
| 2003/0074548 A1 | 4/2003 | Cromer et al. | |
| 2003/0097551 A1 | 5/2003 | Fuller et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0163718 A1 | 8/2003 | Johnson et al. | |
| 2003/0188179 A1 | 10/2003 | Challener et al. | |
| 2003/0196085 A1 | 10/2003 | Lampson et al. | |
| 2004/0042498 A1 * | 3/2004 | Furuness et al. | 370/503 |
| 2004/0117539 A1 | 6/2004 | Bennett et al. | |

FOREIGN PATENT DOCUMENTS

| | | |
|---|---|---|
| EP | 0473913 A2 | 3/1992 |
| EP | 0600112 A1 | 6/1994 |
| EP | 0700002 A1 | 3/1996 |
| EP | 1126356 A1 | 3/1996 |
| EP | 0892521 A2 | 1/1999 |
| EP | 0930567 A2 | 7/1999 |
| EP | 0961193 A2 | 12/1999 |
| EP | 0965902 A2 | 12/1999 |
| EP | 1030237 A1 | 8/2000 |
| EP | 1055989 A1 | 11/2000 |
| EP | 1056014 A1 | 11/2000 |
| EP | 1085396 A1 | 3/2001 |
| EP | 1126356 A2 | 8/2001 |
| EP | 1146715 A1 | 10/2001 |
| EP | 1271277 A2 | 1/2003 |
| JP | 2000076139 A | 3/2000 |
| JP | 2001-230770 A | 8/2001 |
| JP | 2001-318787 A | 11/2001 |
| JP | 2002-232417 A | 8/2002 |
| JP | 2003-051819 A | 2/2003 |
| JP | 2003-108442 A | 4/2003 |
| WO | 95/24696 A2 | 9/1995 |
| WO | 97/29567 A1 | 8/1997 |
| WO | 98/12620 A1 | 3/1998 |
| WO | 98/34365 A1 | 8/1998 |
| WO | 98/44402 A1 | 10/1998 |
| WO | 99/05600 A2 | 2/1999 |
| WO | 99/18511 A1 | 4/1999 |
| WO | 99/57863 A1 | 11/1999 |
| WO | 99/65579 A1 | 12/1999 |
| WO | 00/21238 A1 | 4/2000 |
| WO | 00/62232 A1 | 10/2000 |
| WO | 01/27723 A1 | 4/2001 |
| WO | 01/27821 A2 | 4/2001 |
| WO | 01/63994 A2 | 8/2001 |
| WO | 01/75564 A2 | 10/2001 |
| WO | 01/75565 A2 | 10/2001 |
| WO | 01/75595 A2 | 10/2001 |
| WO | 02/01794 A2 | 1/2002 |
| WO | 99/09482 A1 | 1/2002 |
| WO | 02/17555 A2 | 2/2002 |
| WO | 02/060121 A1 | 8/2002 |
| WO | 02/086684 A2 | 10/2002 |
| WO | 03/058412 A2 | 7/2003 |
| WO | 2005/055024 A1 | 6/2005 |

OTHER PUBLICATIONS

Office Action Received for Chinese Patent Application No. 200480035019.4, mailed on May 8, 2009, 11 pages of Chinese Office Action, and 5 pages of English Translation.

Office Action Received for German Patent Application No. 11 2004002259.2, mailed on Feb. 9, 2007, 2 pages of German Office Action, and 2 pages of English Translation.

Office Action Received for German Patent Application No. 11 2004 002 259.2, mailed on Sep. 8, 2008, 3 pages of German Office Action, and 3 pages of English Translation.

Office Action Received for German Patent Application No. 11 2004 002 259.2, mailed on Jul. 20, 2009, 3 pages of German Office Action, and 3 pages of English Translation.

Office Action Received for Korean Patent Application No. 10-2006-7010203, mailed on Apr. 10, 2008,3 pages of Korean Office Action, and 2 pages of English Translation.

Office Action Received for Korean Patent Application No. 10-2006-7010203, mailed on May 11, 2009, 4 pages of Korean Office Action, and 3 pages of English Translation.

Office Action Received for Korean Patent Application No. 10-2006-7010203, mailed on Oct. 8, 2007,3 pages of Korean Office Action, and 2 pages of English Translation.

Office Action Received for Korean Patent Application No. 10-2006-7010203, mailed on Dec. 19, 2008, 2 pages of Korean Office Action, and 2 pages of English Translation.

Office Action Received for Japanese Patent Application No. 2006-541379, mailed on Sep. 29, 2009, 6 pages of Japanese Office Action, and 6 pages of English Translation.

International Preliminary Report on Patentability received for PCT Patent Application No. PCT/US2004/038734, mailed on Jun. 8, 2006, 7 pages.

Office Action Received for German Patent Application No. 11 2004 002 259.2, mailed on Nov. 30, 2010, 1 page of German Office Action.

European Patent Office, International Search Report and Written Opinion for International Application No. PCT/US2004/038734, May 25, 2005. pp. 11.

Coulouris, George, et al., "Distributed Systems, Concepts and Designs", 2nd Edition 1994, pp. 422-424.

(56) References Cited

OTHER PUBLICATIONS

Crawford, John, "Architecture of the Intel 80386", Proceedings of the IEEE International Conference on Computer Design: VLSI in Computers and Processors (ICCD '86) Oct. 6, 198, pp. 155-160.
Fabry, RS., "Capability-Based Addressing", Fabry RS. "Capabilitv-Based Addressino." Communications of the ACM vol. 17 No. 7 Jul. 1974, pp. 403-412.
Frieder, Gideon, "The Architecture and Operational Characteristics of the VMX Host Machine", The Architecture and Operational Characteristics of the VMX Host Machine IEEE 1982, pp. 9-16.
HP Mobile Security Overview, "HP Mobile Security Overview", Sep. 2002, pp. 1-10.
IBM Corporation, "IBM ThinkPad T30 Notebooks", IBM Product Specification located at www-1.ibm.com/services/files/cisco t30 spec sheet 070202.pdf last visited Jun. 23, 2004, Jul. 2, 2002, pp. 1-6.
Intel Corporation, "IA-64 System Abstraction Layer Specification", Intel Product Specification Order No. 245359-001 Jan. 2000 pp. 1-112.
Intel Corporation, "Intel 82802AB/82802AC Firmware Hub (FWH)", Intel Product Datasheet Document No. 290658-004, Nov. 2000,1-6, pp. 17-28.
Intel Corporation, "IntelIA-64 Architecture Software Developer's Manual", vol. 2: IA-64 System Architecture Order No. 245318-001, Jan. 2000,i, ii, 5.1-5.3, 11.1-11.8, 11.23-11.26.
Menezes, Alfred J., et al., "Handbook of Applied Cryptography", CRC Press Series on Discrete Mathematices and its Applications Boca Raton, FL, XP002165287 ISBN 0849385237,Oct. 1996, pp. 403-405 506-515,570.
Nanba, S. , et al., VM/4: ACOS-4 Virtual Machine Architecture, VM/4: ACOS 4 Virtual Machine Architecture IEEE 1985, pp. 171-178.
RSA Security "Hardware Authenticators", www.rsasecuritv.com/node.aso?id=1158 pp. 1-2.
RSA Security, "RSA SecurID Authenticators", www.rsasecuritv.com/oroducts/securid/datasheets/SID DS 0103.odf 1-2.
Schneier, Bruce, "Applied Cryptography: Protocols, Algorithm, and Source Code in C", Wiley John & Sons Inc. XP002939871; ISBN 0471117099,Oct. 1995, pp. 47-52.
Schneier, Bruce, "Applied Cryptography: Protocols, Algorithm, and Source Code in C", Wiley John & Sons Inc. XP002939871; ISBN 0471117099,(Oct. 1995),47-52 Code in C, Wiley John & Sons Inc. XP002138607; ISBN 0471117099,Oct. 1995, pp. 56-65.
Schneier, Bruce, "Applied Cryptography: Protocols, Algorithms, and Source Code C", Wiley John & Sons Inc. XP0021111449; ISBN 0471117099,Oct. 1995, pp. 169-187.
Schneier, Bruce, "Applied Cryptography: Protocols, Algorithms, and Source Code in C", 2nd Edition' Wiley John & Sons Inc. XP002251738; ISBN 0471128457,Nov. 1995, pp. 28-33; 176-177; 216-217; 461-473; 518-522.
Berg, Cliff, "How Do I Create a Signed Applet?", Dr. Dobb's Journal. (Aug. 1997), pp. 1-9.
Brands, Stefan, "Restrictive Blinding of Secret-Key Certificates", Springer-Verlag XP002201306, (1995), Chapter 3.
Chien, Andrew A., et al., "Safe and Protected Execution for the Morph/AMRM Reconfigurable Processor", 7th Annual IEEE Symposium, FCCM '99. Proceedings, XP010359180. ISBN 0-7695-0375-6. Los Alamitos. CA. (Apr. 21, 1999), pp. 209-221.
Compaq Computer Corporation, et al., "Trusted Computing Platform Alliance (TCPA) Main Specification Version 1.1a", (Dec. 2001), pp. 1-321.
Davida, George I., et al., "Defending Systems Against Viruses through Cryptographic Authentication", Proceedings of the Symposium on Security and Privacv. IEEE Compo Soc. Press, ISBN 0-8186-1939-2,(May 1989).
Goldberg, Robert P., "Survey of Virtual Machine Research", Computer Maaazine (Jun. 1974), pp. 34-35.
Gong, Li , et al., "Going Behond the Sandbox: An Overview of the New Security Architecture in the Java Development Kit 1.2", Proceedings of the USENIX Symposium on Internet Technoloaies and SYstems Monterey, CA, (Dec. 1997).
Gum, P. H., "System/370 Extended Architecture: Facilities for Virtual Machines", IBM J. Research Development. vol. 27. No. 6. (Nov. 1983),pp. 530-544.
Heinrich, Joe, "MIPS R4000 Microprocessor User's Manual, Second Edition", Chapter 4 "Memory Management" (Jun. 11, 1993),pp. 61-97.
IBM, "Information Display Technique for a Terminate Stay Resident Program IBM," Information Display Technique for a Terminate Stay Resident Program 7A (Dec. 1, 1991 ), pp. 156-158.
Intel, "Intel386 DX Microprocessor 32-Bit CHMOS Microprocessor With Inteorated Memory Management", (1995), pp. 5-56.
Karger, Paul A., et al., "A VMM Security Kernal for the VAX Architecture", Proceedings of the Symposium on Research in Security and Privacy XP010020182 ISBN 0-8186-2060-9 Boxborouah MA (May 7, 1990), pp. 2-19.
Kashiwagi, Kazuhiko , et al., "Design and Implementation of Dynamically Reconstructing System Software", Software Engineering Conference.Proceedings 1996 Asia-Pacific Seoul, South Korea Dec. 4-7, 1996, Los Alamitos, CA USA, IEEE Comput. Soc, US, ISBN.
Lawton, Kevin, et al., "Running Multiple Operating Systems Concurrently on an IA32 PC Using Virtualization Techniques", http:/Iwww.olex86.ora/research/oaoer.txt (Nov. 29, 1999),1-31.
Luke, Jahn , et al., "Replacement Strategy for Aging Avionics Computers", IEEE AES Systems Magazine XP002190614,(Mar. 1999).
Menezes, Oorschot, "Handbook of Applied Cryptography", CRC Press LLC. USA XP002201307. (1997),475.
Motorola, "M68040 User's Manual", (1993),1-1 to 8-32 Franzis Verlag GMBH. Munchen. DE. vol. 40, No. 16, XPOO0259620,(100-103),Aug. 6, 1991.
Robin, John S., et al., "Analysis of the Pentium's Ability to Support a Secure Virtual Machine Monitor", Proceedings of the 9th USENIX Security Symposium, XP002247347 Denver Colorado (Aug. 14, 2000),1-17.
Rosenblum, M., "Virtual Platform: A Virtual Machine Monitor for Commodity PC", Proceedings of the 11th Hotchios Conference (Aug. 17, 1999),185-196.
Office Action Received for Chinese Patent Application No. 200480035019.4, mailed on Mar. 21, 2013, 3 pages of Chinese Office Action, and 4 pages of English Translation.
Office Action Received for Chinese Patent Application No. 200480035019.4, mailed on Nov. 1, 2012, 5 pages of Office Action and 6 pages of English Translation.
Office Action Received for Chinese Patent Application No. 200480035019.4, mailed on Dec. 4, 2013, 3 pages of Chinese Office Action, and 5 pages of English Translation.
Saez, Sergio, et al., "A Hardware Scheduler for Complex Real-Time Systems", Proceedings of the IEEE International Symposium on Industrial Electronics, XP002190615,(Jul. 1999},43-48.
Sherwood, Timothy, et al., "Patchable Instruction ROM Architecture", Department of Computer Science and Engineering, University of California. San DieaoLa Jolla CA (Nov. 2001).
IA-32 Intel® Architecture Software Developer's Manual, vol. 3: System Programming Guide, Intel Corporation—2003 (pp. 13-1 through 13-24).
Office Action Received for Chinese Patent Application No. 200480035019.4, mailed on Jun. 8, 2007, 3 pages of English Translation.
Office Action Received for Japanese Patent Application No. 2011-000154, mailed on Jan. 17, 2012, 3 pages of Japanese Office Action and 1 page of English Translation.
Office Action Received for Chinese Patent Application No. 200480035019.4, mailed on Jul. 12, 2013, 10 pages of Chinese Office Action, and 10 pages of English Translation.

\* cited by examiner

ACCESSING PRIVATE DATA ABOUT THE STATE OF A DATA PROCESSING MACHINE FROM STORAGE THAT IS PUBLICLY ACCESSIBLE

CROSS REFERENCE TO RELATED APPLICATIONS

This application is a continuation of U.S. patent application Ser. No. 10/724,321, filed Nov. 26, 2003, entitled "ACCESSING PRIVATE DATA ABOUT THE STATE OF A DATA PROCESSING MACHINE FROM STORAGE THAT IS PUBLICLY ACCESSIBLE," the content of which is hereby incorporated by reference.

BACKGROUND

Some of the embodiments of the invention relate to how processors read and write state data from and to a storage of a computer system. Other embodiments are also described.

Due to various design considerations, some processors may write private-state data to regions in publicly-accessible storage. The format, semantics and location of this private-state may vary between design implementations. In literature describing the processor, such storage regions are often marked as "RESERVED" indicating that their contents should not be read or modified because they contain private-state. Unfortunately, because this data is written to publicly-accessible storage, software applications, operating systems or external agents (e.g., input-output devices) may access the storage region and use the private-state stored therein inappropriately. Access and use of this private-state by such non-approved entities may lead to erroneous and/or undesirable effects for processor and platform manufacturers and end users.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Processor state, as written to a storage, such as memory, during operation of a processor may include two types of information or data. One type is referred to herein as architectural data, while the other is called implementation-specific data (also herein referred to as "private data" or "private-state data").

Architectural data is state information which is common to all processors of a given class as designated by the manufacturer, i.e. having substantially the same high-level interface between hardware and software. This interface is called the instruction set architecture (ISA). The use of the same ISA on a variety of processor implementations facilitates the ability of software written expressly for one implementation to run on later implementations unmodified.

An ISA defines the state available to software running on the processor, its format and semantics, and available operation interfaces (e.g., instructions, events). Part of this ISA specification describes how the processor may use one or more regions in the machine's storage (e.g., memory) to facilitate its operations. These storage regions may be accessible to software and other devices in the data processing machine in which the processor resides (e.g., input-output devices, etc.). The processor may use these storage regions to store both architectural and private-state data.

For example, consider processors that have the ISA of the Intel® Pentium® processor as manufactured by Intel Corporation, herein referred to as the IA-32 ISA. The processor may utilize regions in storage during certain operations. For example, when an IA-32 ISA processor enters system management mode, it stores various values to a region of storage called the system management (SMM) state save area. A variety of architectural data is stored (e.g., various machine registers such as ESI, EBP, etc.) in locations and formats which are specified in documentation for the ISA. Additionally, a variety of private data is stored to the system management state save area. In documentation for the ISA, these private-state areas are labeled "Reserved"; the contents, format and semantics of this private data are not specified in the ISA documentation. These "reserved" regions of storage are referred to herein as "private-state regions".

Different processors may be designed to have different private-state data, also herein called "private data". This may be done, for example, to improve performance or reduce manufacturing cost. For example, new internal registers may be added, some of the old ones may be used differently, and the format or location of their content that is to be written to storage may be changed for greater efficiency. As a result, the private data for these more recent processors will be different, in content, format, semantics or location, from those of the older versions.

Difficulty can arise when private-state data is stored in publicly-accessible areas such as main memory or other storage. Here it is possible for software such as, for example, the basic input-output system (BIOS), operating systems, virtual machine manager or hypervisor, device drivers, or applications and hardware such as I/O devices or other external agents to access (i.e., read and/or write) this private-state data. Use of this private-state data by such entities may lead to erroneous and/or undesirable effects for processor and platform manufacturers and end users. For example, if an application depends on particular private-state data available in one processor implementation, it might function incorrectly when the application is run on a different processor implementation which implements the private-state differently (or does not implement it at all). Software that depends on private data may also fail due to internal processor-to-memory coherency behaviors/policies that change from implementation to implementation. Software reliance on private-state data may complicate and/or hobble implementation alternatives available to the processor manufacturer with regard to private-state usage. Therefore, processor manufacturers often document such private data (and its storage in memory regions) as RESERVED, indicating that it is subject to change in future implementations.

The above-mentioned ability to run old software on a newer machine assumes that the old software did not improperly access a machine's private data (which can change with newer versions of the machine). However, it has been found that software developers are writing application and operating system programs that do the opposite, namely accessing and relying upon private data, as it is stored in, for example, main memory. This creates a problem because older software may not run properly on a newer machine, even though the newer machine has the same architectural data as the older machine and can still "understand" older mechanisms for accessing stored state data (e.g., load and store instructions as defined in the ISA). That is because some or all of the private data may have changed in the newer machine, causing software to function incorrectly. In addition, the manufacturer may be reluctant to add improvements to future versions of its processor because doing so would risk incompatibility problems with older software.

According to an embodiment of the invention, a data processing machine and a method of operation are described which may discourage a software developer from writing software that relies upon private-state data (e.g., a certain value, its location, its semantics or its format) that is stored in a publicly-accessible region of storage. This may allow future versions of the machine to exhibit different behavior with respect to private data that may be needed as the machine's internal hardware design evolves, yet still exhibit the same ISA needed to run older software.

Some embodiments of the invention may encourage use of architected interfaces to data stored as private-state data. For example, instructions may be provided to access data that may be stored as private-state data by specifying the identity of the data to be accessed, rather than the location of the data within the private-state data region. This allows implementation freedom in how the data is stored (e.g., within the private-state region) while providing an architectural mechanism to access the data. For example, suppose that a data element stored in the system management state save area of the IA-32 ISA (as described above) is the value of the CS segment base address. The storage location of this data element within the state save area is not detailed in the ISA specification. Instead, an instruction may be provided by the ISA which indirectly addresses the data. The data element may be encoded and stored in the state save area in any manner that a processor implementation desires (or it may not be stored in the private-state area in memory at all, and instead retained in, for example, a special register or location within the processor).

The invention permits private-state data to be encoded in a manner that thwarts speedy software decode of the data as compared with the prescribed, architected interfaces. Embodiments of the invention may vary the encoding complexity depending on the target processor and platform. Once the target processor is known, one skilled in the art can choose an embodiment of the invention that ensures that software-based methods to decode the chosen encoding take longer than using the prescribed interfaces (e.g., instructions). For example, non-prescribed software methods may be able to decode certain private-state data in 400 clocks (e.g., using certain instructions and algorithms) while architecturally prescribed instructions and methods would work in a fraction of that time. An embodiment of the invention lies in the use of certain metrics to measure the cost of private state decode, including, for example, the metrics of time (speed) and power consumption.

Herein the term "encoding" includes concepts such as encrypting, ciphering, formatting, or the assignment or interpretation of specific bit patterns. Encodings by embodiments of this invention are said herein to "obfuscate" the private data.

Figure 1:
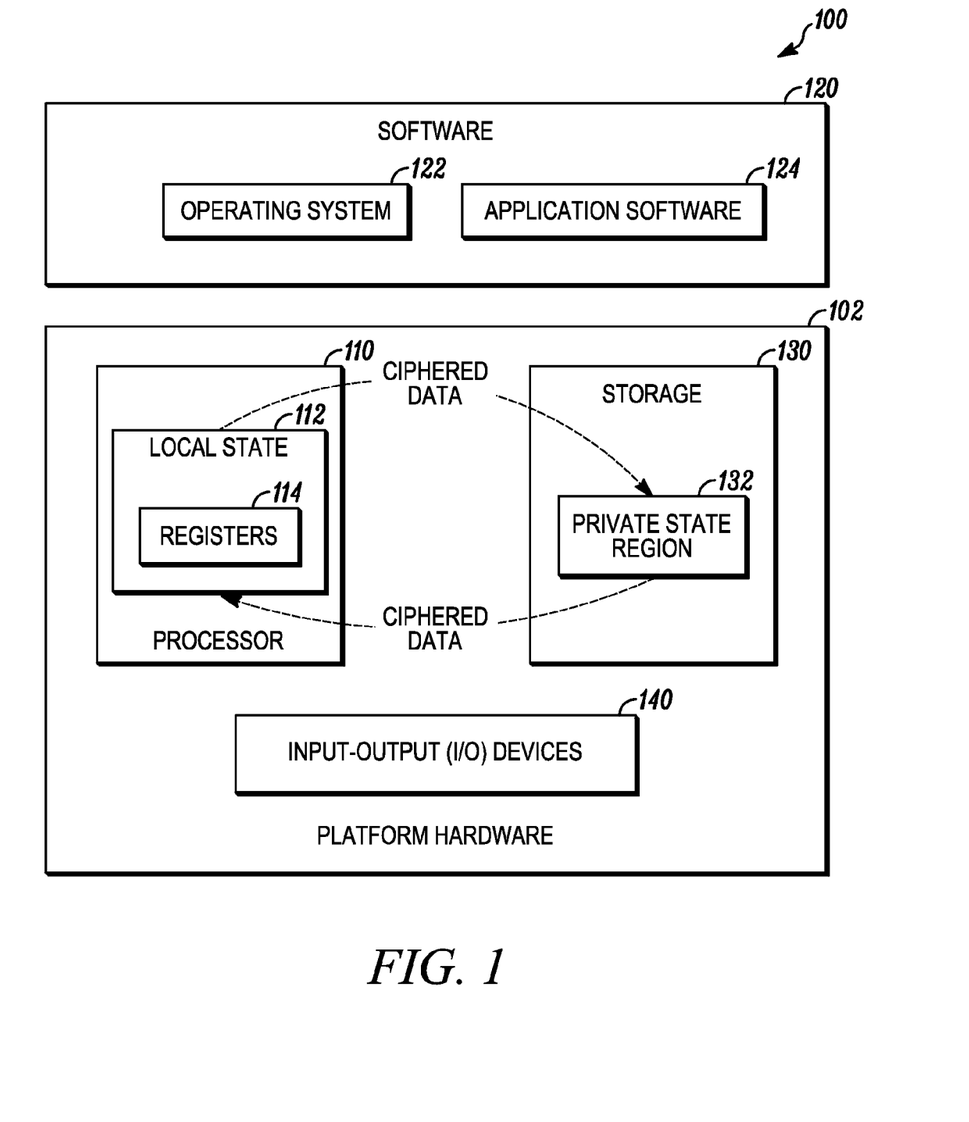
FIG. 1 shows a block diagram of a computer system which may obfuscate/encode the public storage of private-state data, according to an embodiment of the invention.

Referring now to FIG. 1, a block diagram of a computer system is shown. Software 120 is running on platform hardware 102. The platform hardware 102 can be a personal computer (PC), mainframe, handheld device, portable computer, set-top box, or any other computing system. The platform hardware 102 includes a processor 110, storage 130 and may include one or more input-output (I/O) devices 140.

Processor 110 can be any type of processor capable of executing software, such as a microprocessor, digital signal processor, microcontroller, or the like. The processor 110 may include microcode, programmable logic or hard-coded logic for performing the execution of certain method embodiments of the present invention. Though FIG. 1 shows only one such processor 110, there may be one or more processors in the system.

The one or more I/O devices 140 may be, for example network interface cards, communication ports, video controllers, disk controllers, system buses and controllers (e.g., PCI, ISA, AGP) or devices integrated into the platform chipset logic or processor (e.g., real-time clocks, programmable timers, performance counters). Some or all of the I/O devices 140 may have direct memory access (DMA) capability, allowing them to read and/or write the storage 130 independent of, or under the control of, the processor 110 or software 120.

Storage 130 can be a hard disk, a floppy disk, random-access memory (RAM), cache memory, read-only memory (ROM), flash memory, static random access memory (SRAM), any combination of the above devices, or any other type of storage medium accessible by processor 110. Storage 130 may store instructions and/or data for performing the execution of method embodiments of the present invention. The storage 130 may be a publicly accessible area of a register file of the processor, or it may be an area outside of the processor such as main memory.

Data about a state of the machine 112, such as the contents of certain internal registers 114, is written to a private-state region 132 in storage 130, where the state data as written is "encoded" or "obfuscated." Thus, although the location where the state data is written is public in that it may be accessed by I/O devices 140 or software 120 (e.g., operating system 122, application software 124) running on the platform hardware 102, the encoding makes it difficult for the state data to be reverse engineered (i.e., decoded) in a timely manner. When the state data is to be recovered from the storage 130, a specified decode process, e.g. a processor-initiated decode process defined by the manufacturer of the processor, is applied. Control over the decode process may be linked to specific processor functions, such as specific instructions and control signals, as discussed below. Non-prescribed methods (alternate software instructions and algorithms) for accessing the state data would not activate these controls and accordingly may be more costly.

The recovered state data may then be placed into the local state 112, which may or may not be accessible to software 120 or I/O devices 140. The local state 112 may be, for example, a region in an internal cache or registers which are not available for ungoverned access through the instruction set architecture (ISA). In some cases local state is not accessible by software or other external agents (e.g., I/O devices). In some cases, some or all of the local state is accessible to software or other external agents. In other cases local state may be indirectly accessible through specific interfaces (e.g., instructions). Because it is internal to the processor and not in "public" storage, the processor can strictly dictate access to the local state.

Although the state data as written to the publicly accessible area of the storage 130 is in an encoded form, a manufacturer-defined instruction that may be part of the ISA for the processor may be used by software to recover the data from the storage 130. The encoding should be strong enough so as to discourage software developers from circumventing such an instruction, when seeking to access the state data. An example of the internal logic needed for reading or recovering the state data from storage, using a micro-operation or hardware control signal, will be described below with reference to FIG. 5.

In one embodiment, the encoding process used need only be strong enough to cause an author of software 120 to apply, in writing the software, a technique that may be prescribed by a manufacturer of the processor for accessing the state data from memory, rather than circumventing the technique. In other cases, the encoding may be stronger if the manufacturer intends to make it even more difficult for the software developer to access and rely upon the state data (including a certain value, its location, its semantics or its format) that is in memory.

Control signals used to control the encoding and decoding of the private-state may be coupled with or accessed by, for example, hardware state machines, processor instructions (also known as macro instructions), operational modes (e.g., PAL modes) or mode bits or operational groups of instructions, microcode or microcode operations (uops), and hardware control signals or events.

Various types of encoding processes may be used. The data written to the private-state region of storage may be changed prior to storage. This type of encoding process is called data encoding. Alternatively, the addresses used to access private-state in private-state regions may be changed. This type encoding process is called address obfuscation and the transformation from the original address to the obfuscated address is referred to as address mapping. Data encoding and address obfuscation are described below.

Encoding processes may be either static or dynamic. Static encodings do not change over time as a machine is running (and performing the encoding processes). (Static encodings may change or be reconfigured during the processor initialization/reset or boot phase, but not afterwards during running operation.) A process that generates static encodings is called static obfuscation. Alternatively, the encoding process may produce encoding results which change over time while the processor is running. These processes are referred to herein as dynamic obfuscation.

For example, a storage format of the contents of a given element of private-state, as written in the storage 130, may change while the machine is executing. This is referred to herein as dynamic obfuscation. For example, the format may change between big-endian and little-endian according to a random or pseudo-random sequence (which the processor generates and tracks), whenever the state data needs to be written to storage; this change may only affect the memory region(s) to which the private data is read and written. Again, the intent here is to make it difficult to quickly reverse engineer and decode the state data from a region of storage that is publicly accessible in storage 130.

In an embodiment, when private-state data is to be written to storage, it is written to a region of storage (e.g., main memory) with contiguous addresses. In other embodiments the private data region is non-contiguous, consisting of more than one distinct regions of storage. There is no requirement that the encoding fully populate the private-state region; i.e., some bits or bytes may remain unused. Some freedom in designing the encoding and/or obfuscation functions may be obtained by changing the private-state region size, by, for example, making it bigger than strictly required to store the private data. (For example, this would permit, as described later, larger MISR (multi-input shift register) polynomials to be used.)

In an embodiment of the invention, a multi-byte (e.g., 32-bit "long" integer) value of state data is split into several parts which are then stored in non-contiguous locations, rather than all in sequence. Thus, a 4-byte value may be split into four 1-byte values that are stored in non-contiguous locations within a private-state region. The locations at which the four 1-byte values are stored may change dynamically and in a random way while the machine is operating. Of course, the embodiment should be able to locate and decode such data. Note that the ISA may impose certain requirements regarding atomicity of the accesses in cases where single data values are stored or loaded using multiple memory accesses.

In an embodiment of the invention, the address bits used to access storage are encoded. This encoding of address bits may change address bit ordering (or groups of address bits). An example of this might be switching from little-endian to big-endian formats within a given memory region. Other address mixing mappings are possible, some involving more elaborate transformations.

Figure 4:
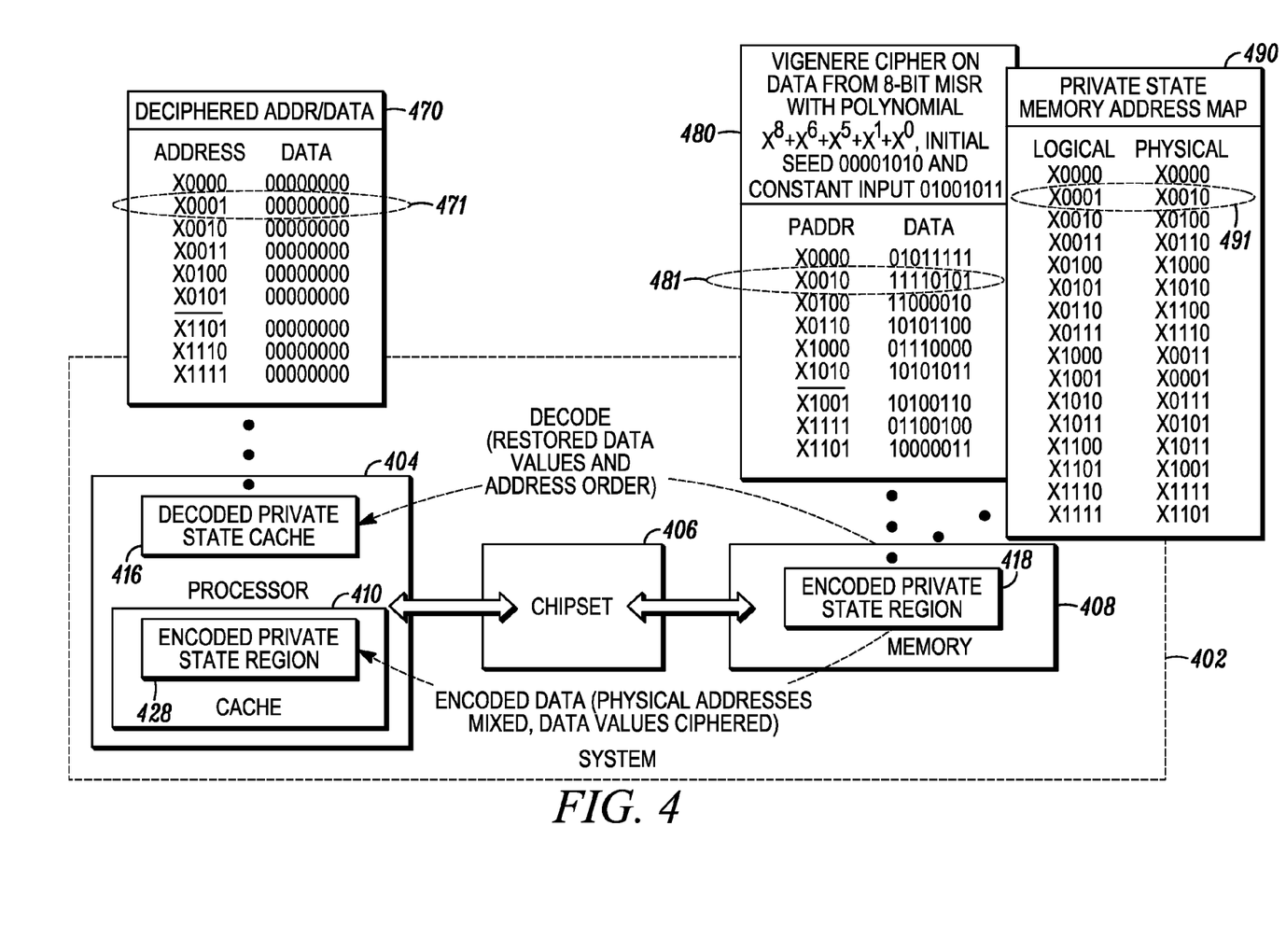
FIG. 4 shows a block diagram of a computer system in which the processor is designed to obfuscate/encode its private-state data as written to public storage, according to an embodiment of the invention.
Figure 6:
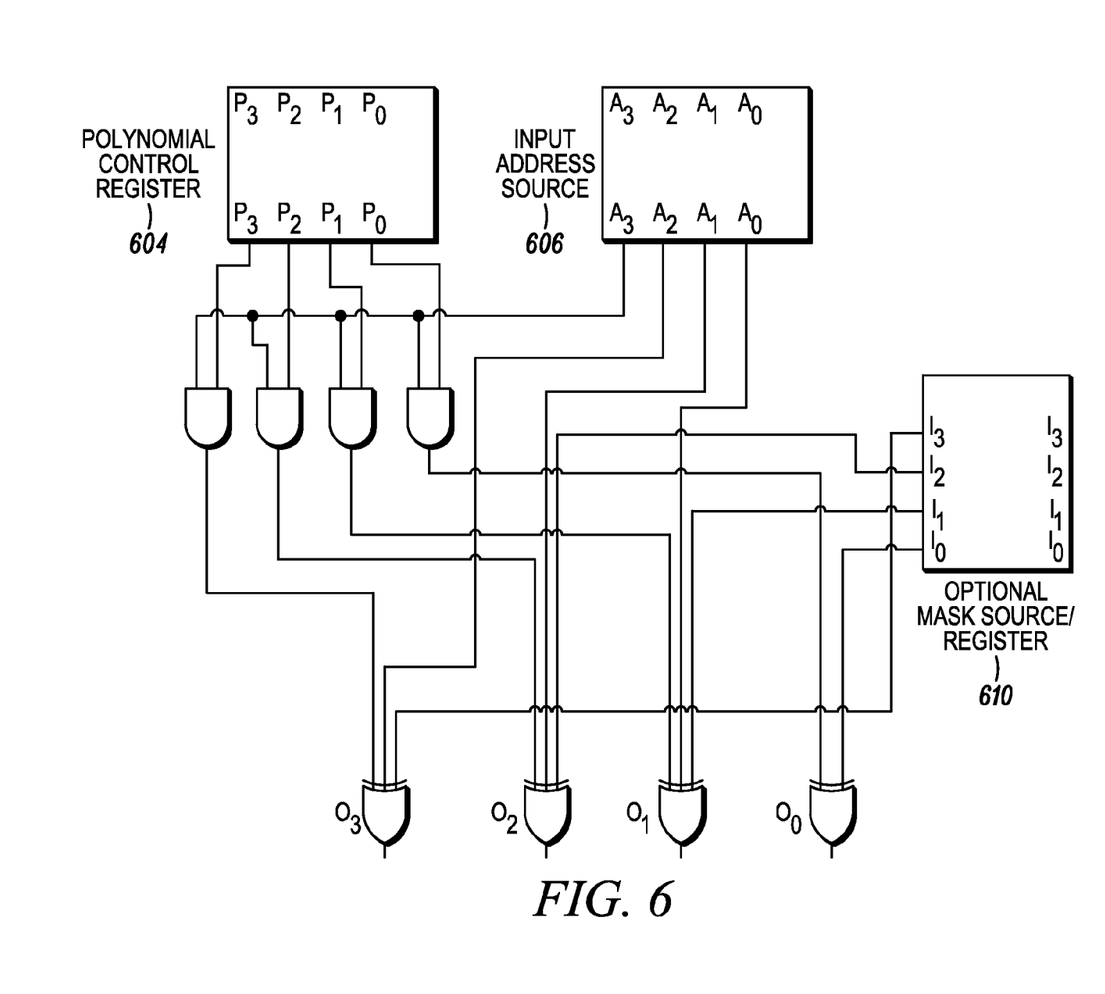
FIG. 6 depicts a more detailed logic diagram of part of an example address obfuscation/encoding unit, according to an embodiment of the invention.

Another type of address encoding maps a set of K unique addresses to another set of K unique addresses; that is, mathematically the mapping is bijective (both injective (one-to-one) and surjective (onto)). Here, the upper address bits may remain unchanged, while the lower-order address bits are modified. In such cases it is possible to construct mappings that map a given memory range back onto itself. That is, the base address offset of the memory range is the same and the memory region size is the same. This is an attractive solution because only the data within the memory range is "obfuscated". That is, only the address bits within the range are mixed. FIG. 4 and FIG. 6 provide examples of one such mapping and associated address-mixing mechanism.

Address obfuscation mechanisms may be easier to use when the private-state regions have sizes or base addresses that are powers of the underlying N-ary logic. Most current processors use binary logic, hence private-state regions with sizes or base addresses that are powers of 2 are preferable. (Herein, binary logic and arithmetic are discussed, but N-ary logic and arithmetic could be used, where appropriate, and are assumed in the general case.) Filters and other mechanisms may be used to manage private-state regions with sizes or base addresses that are not powers of the N-ary logic. Such address bit manipulations can coexist with various memory organizations and virtual memory techniques (e.g., paging, segmentation, etc).

Address obfuscation mechanisms may change the layout of data within the storage, and serve to mix up the data, but sometimes only at granularities of the storage. In most current processors, main memory is byte addressable, hence the location of individual bytes of a data element may be rearranged within the private-state region, but the data bits within individual bytes are not changed by address obfuscation (though they may be altered by data encoding mechanisms).

In these address-mapping embodiments, the original address mappings may be extracted through some decode process. This extraction is the application of the inverse function of the address mapping function. The choice of mapping function may be made in light of this requirement; not all address mapping functions are reversible.

An embodiment of the invention encodes the data bits written to storage. These data encodings may reshape data stored within the private-state region without necessarily being constrained by addressability constraints such as the size of addressable storage. Segments of data may be swapped with other segments of data. For example, two nibbles (i.e., 4-bit segments within a byte) can be swapped within each byte. Data encodings may be bit-wise exclusive-OR'ed with a constant XOR mask. Data may also be bit-wise exclusive-OR'ed with the output of a multi-input feedback shift register (MISR). Data encodings may be made using a cryptographic function. In these embodiments, the original data can be extracted through some decode process. That decode process should ensure that it is faster than decode methods available to software running on the platform (e.g., use of ISA-defined load and store operations, mathematical operations, etc.). The tables 470 and 480 of FIG. 4, for example, illustrates the use of a Vigenere-like cipher applied to data (bytes) in a given 16-byte range of memory addresses.

Some of the embodiments listed above may be implemented with static mappings. That is, they do not change during the time the processor or platform is running. Suitable mappings may be set at design time, during manufacture, post manufacture, or early in system operation (e.g., during system boot, at system power on, at processor reset). Different processors may or may not be configured with the same static mappings. If mappings are not bound until the system is operational (e.g., at system boot), it is possible for a new mapping to be chosen at each processor boot. In an embodiment, different control sets (e.g., operating modes, groups of instructions) can each use a different mapping configuration. Within a control set, the mapping remains constant. However, between instruction groups or modes, the mappings may (or may not) be distinct.

Other embodiments may be implemented with dynamic mappings that change while the processor is operating. In an embodiment, mapping configurations can only change if there are no outstanding encoded data currently stored in any private-state regions in storage. This embodiment may use a counter that is incremented when encoded data is written to a private-state region of the storage, making it active. The counter is decremented when the private-state region is no longer considered active. When the counter is zero, the mapping configuration may be changed. In an embodiment, the mapping configuration is stored for each private-state region in a mapping descriptor. The mapping descriptor may be stored in a known, un-encoded location within the private-state region itself or maintained separately by a tracking structure such as a queue or look-up table, which may reside inside or outside the processor. In an embodiment, different mappings for each private-state region are possible.

Figure 2:
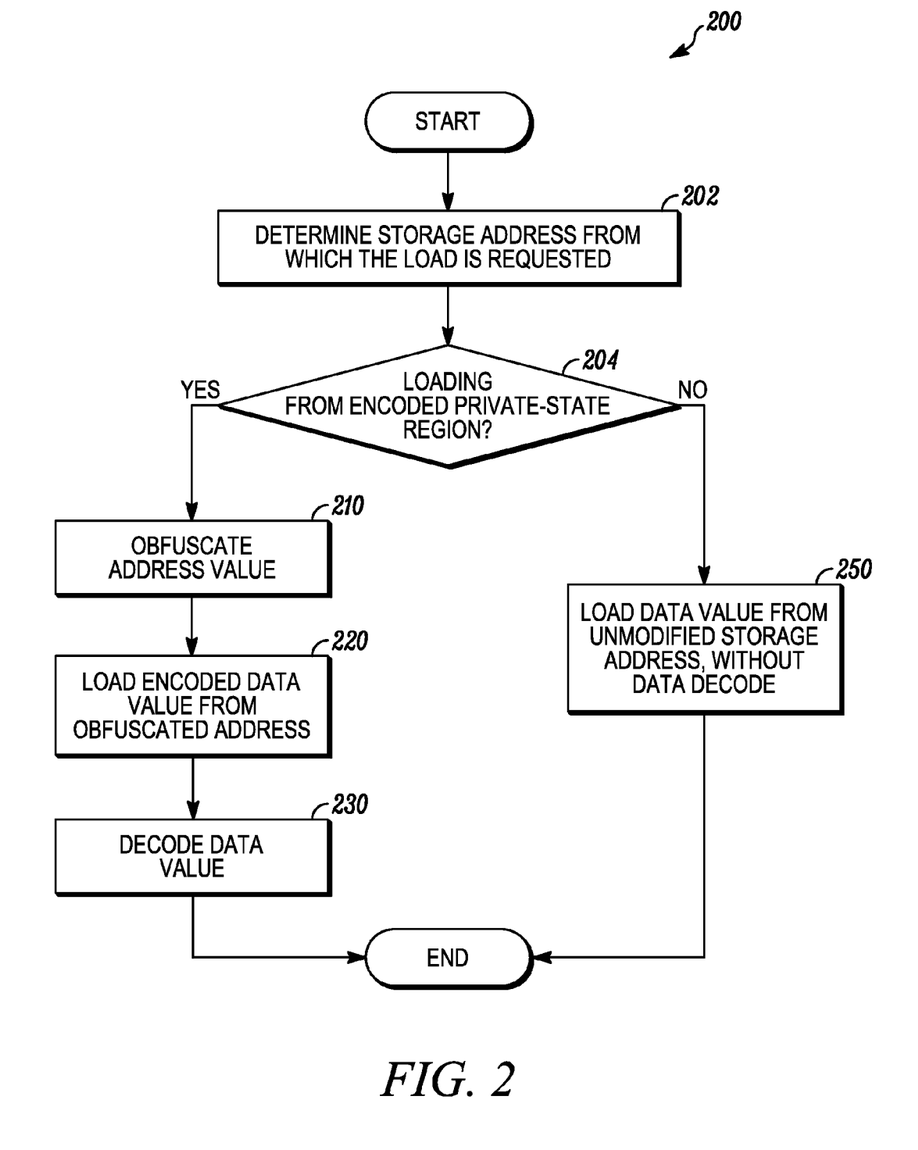
FIG. 2 illustrates a flowchart depicting a method for reading an encoded private-state data value from a private-state storage region according to an embodiment of the invention.

FIG. 2 illustrates process 200 for reading an encoded private-state data value from a private-state storage region according to an embodiment of the invention. The process may be performed by processing logic that may comprise hardware (e.g., circuitry, dedicated logic, programmable logic, microcode, etc.), software (such as run on a general purpose computer system or a dedicated machine), or a combination of both. In one embodiment, processing logic is implemented in processor 110 of FIG. 1.

Referring to FIG. 2, process 200 begins with processing logic determining an address for the data element (processing block 202). Next, processing logic determines if the data element is stored in encoded form in a private-state region of storage (processing block 204).

An embodiment of the invention uses a microcode-generated or hardware-generated control signal which indicates to the processing logic that the data element requested requires decoding. Absence of this signal causes the NO path to block 250 to be taken.

If the data element is not to be decoded, then processing logic proceeds to processing block 250, where it loads the data element from storage at the address determined in processing block 202. The process may then terminate. The data loaded is not decoded; that is, no address or data decoding is performed. Note that the data read on this path may be ordinary (i.e., is not private-state data) or it may be private-state data in its encoded form (but accessed in a non-prescribed manner).

If, however, the data element is to be decoded, then processing logic next determines the address at which it is stored (the address may be obfuscated) based on the address determined in processing block 202 (processing block 210). Processing logic next loads the encoded data element from storage at the address determined in processing block 210 (processing block 220). Processing logic next decodes the data element loaded from the private-state region of storage in processing step 220 (processing block 230). The decoded value is a result of process 200. The process may then terminate. Often this decoded state is placed in a private state cache or the private, local state of the processor.

Figure 3:
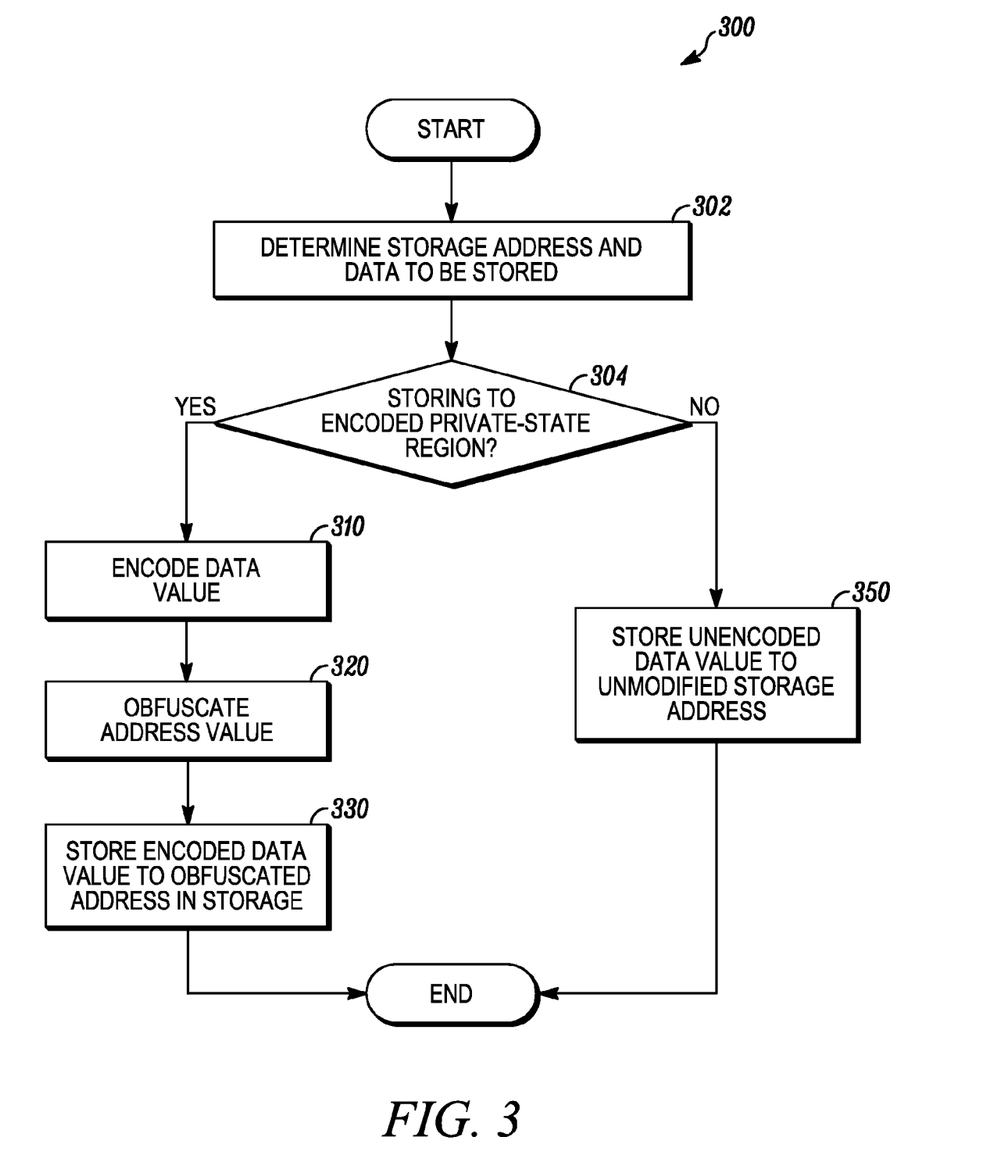
FIG. 3 illustrates a flowchart depicting a method for storing an encoded private-state data value to a private-state storage region according to an embodiment of the invention.

FIG. 3 illustrates process 300 for storing a private-state data value to a private-state region of storage according to an embodiment of the invention. The process may be performed by processing logic that may comprise hardware (e.g., circuitry, dedicated logic, programmable logic, microcode, etc.), software (such as run on a general purpose computer system or a dedicated machine), or a combination of both. In an embodiment, processing logic is implemented in processor 110 of FIG. 1.

Referring to FIG. 3, process 300 begins with processing logic determining a data value and a storage address of a data element (processing block 302). Next, processing logic determines if the data element to be stored is a private-state element to be stored in encoded form to a private-state region of storage (processing block 304).

An embodiment of the invention uses a microcode-generated or hardware-generated control signal to signal the processing logic that the data element being written requires encoding. Absence of this signal causes the NO path to block 350 to be taken.

If the data element is not to be stored in encoded form in a private-state region, then processing logic proceeds to processing block 350, where it stores the data element in unencoded (unmodified) form to storage at the address determined in processing block 302. The process may then terminate. The data written is not encoded.

If, however, the data element is to be stored in encoded form in a private-state region, then processing logic next encodes the data element (processing block 310) and determines an obfuscated address at which to store the data element (processing block 320). Processing logic then stores the now encoded data element to storage at the address determined in processing block 320 (processing block 330). The process may then terminate.

Note that the processing performed in processing block 310 and processing block 320 may be performed in the reverse order, i.e. obfuscation of the address value prior to encoding of the data. Some embodiments will perform one and not both of these processing blocks. Some embodiments may perform the processing blocks in parallel.

Turning now to FIG. 4, a computer system 402 is depicted in block diagram form. This system 402 has a processor 404 that is designed to support the methodology described above for obfuscating the private-state data in storage. The processor 404 has a standard cache 410 and a private cache 416, where the latter is not accessible to software executing on the system 402 and is used to store the private-state data in an un-encoded (non-obfuscated) form. In this embodiment, a system chipset 406 is also provided to allow the processor 404 to communicate with the memory 408. The chipset 406 may include a memory controller (not shown) as well as other logic needed to interface with peripheral devices of a computer (also not shown). In some embodiments, the functionality of the chipset 406, or a functional subset, may be implemented in the processor 404.

In FIG. 4, the memory 408 is shown as storing, in a publicly accessible region 418, the encoded private-state data of the processor 404. This is an example where a cipher has been applied to the values of the internal processor state of the processor 404, so that the actual values cannot be easily recovered or reverse engineered by simply monitoring and reading the memory 408.

As described above, the obfuscation of data stored in the encoded private-state region 418 may be achieved in a variety of ways. FIG. 4 shows an example of one such mechanism whereby both the data values are encoded and the data layout is encoded/obfuscated. First data values in table 470 are encoded using a Vigenere cipher yielding the data values shown in table 480 (described below). Then a special mapping from logical address values of the private-state data to physical address values is applied where the mapping results illustrated in table 490. The physical addresses dictate where the private-state data is actually stored in memory. The physical addresses are thus said to result from an encoding of the logical addresses.

The table 470 in FIG. 4 entitled "deciphered addr/data" has a list of example logical addresses and their associated private-state data values which are stored in un-encoded form in the cache 416. Here all zero data values were chosen to demonstrate the resulting encoding. Note that an 'X' represents the unencoded upper bits of the virtual and physical address of the state data. The table 490 entitled "Private State Memory Address Map" shows an example of the mapping between unencoded and encoded addresses. Here, only the low-order 4 bits are encoded.

FIG. 6. illustrates an embodiment of a programmable (parameterized) address mapping function that may be used in the system of FIG. 4. In FIG. 6, one would load the polynomial control register 604 with P.sub.0=1, P.sub.1=1, P.sub.2=0, P.sub.3=0 to implement primitive polynomial x.sup.4+x.sup.1+x.sup.0 and load the Optional mask register 610 with all zeroes. This logic is an adaptation of the equations governing generic w-bit wide MISR's and can be used to construct various address encoding combinational logic. The parameterized MISR state equations are:

$$S_i(t+1)=S_{i-1}(t)+I_i+(P_i \cdot S_{w-1}(t)), 1 \le i \le w-1$$

$$S_0(t+1)=I_0+(P_0 \cdot S_{w-1}(t))$$

Here the operator "+" represents modulo 2 addition (XOR) and "·" represents modulo 2 multiplication (AND). Parameter "t" represents time (clock ticks), $S_i$ the state of the i'th flip-flop, $I_i$ the i'th input vector bit, and $P_i$ the i'th polynomial coefficient. The $P_w$ coefficient is implicitly 1. To achieve the address mixing embodiment of FIG. 4, replace all $S_i(t)$ with the corresponding address $A_i$ values and $S_i(t+1)$ with output $O_i$. Other embodiments are possible.

Primitive polynomials of order w are useful in that they can generate a "maximal sequence"; that is, they can generate all w-bit wide binary combinations or patterns. Primitive polynomials of up to degree 300 (300 bits wide) and even higher orders may be used.

To illustrate the above function, using FIG. 4, to access data at logical address offset 0001 (as shown in entry 471), the physical memory at location 0010 is accessed (as entry 491 shows). The un-encoded content value (see entry 471) associated with this address in this case happens to be all zeros. However, when stored in encoded form as shown in entry 481, a non-zero bit string (i.e., 11110101) appears in the public region 418 of the memory 408. (This encoding cipher is described in more detail later.) Although limited bit widths are shown for convenience, the technique may be applied to wider or parallel, bit-sliced data.

Figure 5:
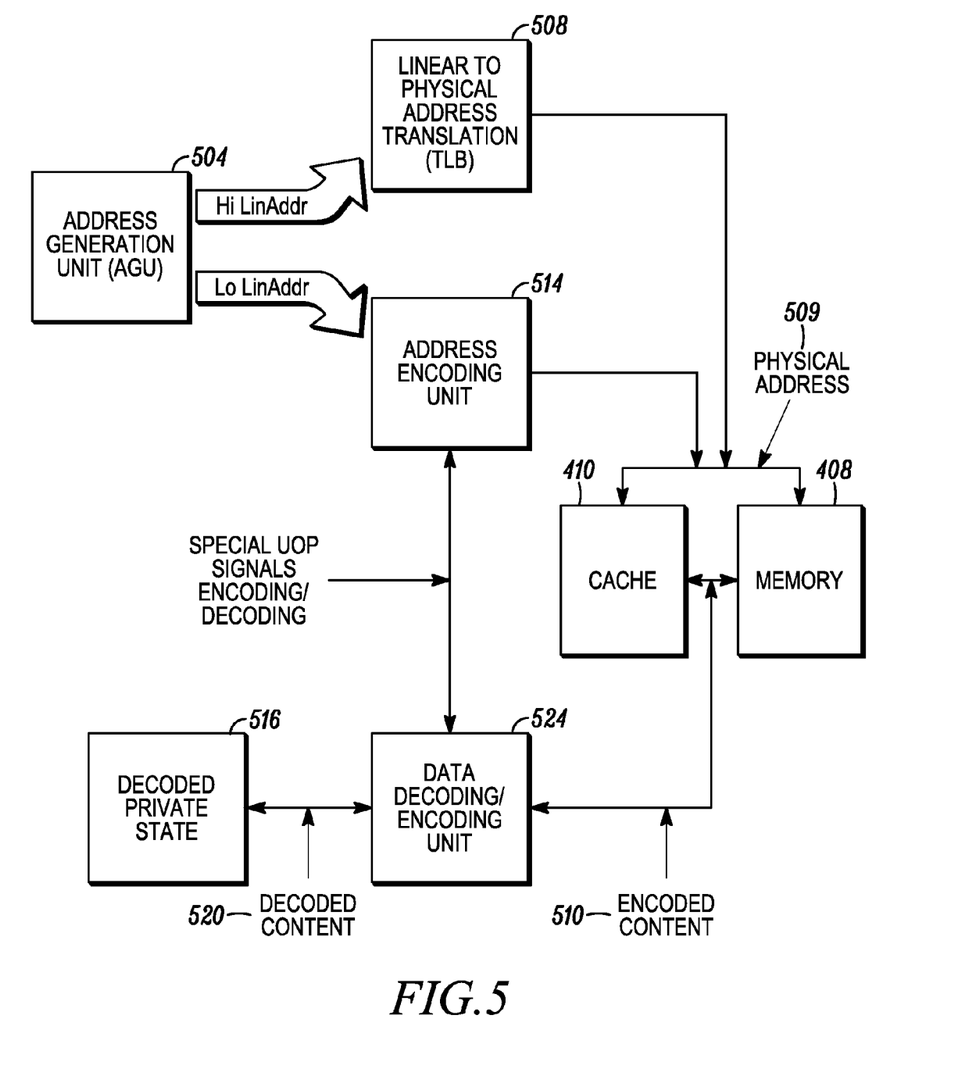
FIG. 5 illustrates example functional components that may be used to implement the obfuscation/encoding of the private-state data, according to an embodiment of the invention.

Storage and recovery of the encoded private-state data in memory 408, as shown in FIG. 4, may be implemented using the logic blocks shown in FIG. 5. For this example, a special micro-operation (e.g., control signal) has been defined for the processor to use when storing or recovering private-state data from storage.

An address generation unit (AGU) 504 receives a special micro-operation and, in this embodiment, computes a logical address having a high component and a low component. In an embodiment, the logical address is a virtual address. In another embodiment, as shown in FIG. 5, the logical address is a linear address as found in Intel® Pentium® processors. In yet another embodiment, the logical address is a physical address and no translation of the high address bits need be done. In FIG. 5, the high component of the address is fed to a linear-to-physical address translation block (also referred to as a translation look-aside buffer or TLB) 508 which translates this high component of the linear address (that may be a virtual page number) into part of a physical address 509.

An address obfuscation/encoding unit 514 is to receive in this embodiment the low portion of the linear address value that is associated with the given private-state data of the processor. In response, the address obfuscation unit 514 translates this low component of the linear address to provide another portion of the physical address 509. The value of this portion of the physical address is a mixed or encoded version of the linear address, as described above with reference to FIG. 1 and FIG. 4, for example.

In an embodiment, the special micro-operation or uop signal (control signal) determines if the address encoding unit 514 is to encode the low-order address bits. If the control signal is not asserted, the low-order address bits can pass through un-encoded, or bypassing the unit 514. Even when the encoding control signal (or signals) are asserted, some address bits may pass though un-encoded. This might occur, for example, if only a subset of the address bits need encoding when the private-state memory region is smaller than the address space size addressable by the low-order bits. Other embodiments exist where address encoding occurs after linear-to-physical address translation and therefore can handle encodings of address spaces that are larger than a virtual-memory page. An advantage of the embodiment shown in FIG. 5 is that the linear-to-physical translation occurs in parallel with the encoding operation instead of serially, so it is potentially faster. Also, encodings are often only necessary for private-state memory regions that are smaller than the virtual-memory page size.

The high component of the physical address (generated by the TLB 508) and the low component of the physical address (generated by the address obfuscation/encoding unit 514) when concatenated, produce physical address 509, which points to the actual location in the memory 408 where the given state data is stored. The physical address 509 is, in this embodiment, first applied to the cache 410 and if this results in a miss, the contents of the location are fetched from the memory 408 or stored to memory 408 (depending on whether the operation is a load or store). Other arrangements of the memory hierarchy are possible.

Note that in this embodiment, a region that has been designated in the memory 408 for storage of the private-state data may occupy only a portion of a page, and may be aligned to a virtual memory page boundary. In that case, only the page-offset portion of the linear address (that is the low portion of the linear address), is passed through the address obfuscation/encoding unit 514, to produce the encoded physical page offset. Other implementations are possible. In addition, the address obfuscation/encoding unit 514 may contain range-selection logic, so that only addresses within specific regions of memory are encoded. With this logic, the storage region may not be required to be aligned to a virtual memory page boundary or, as discussed earlier, a power of 2 in size. Internally, the address obfuscation/encoding unit 514 may be implemented using microcode, software, lookup tables, fixed-function logic, programmable logic or any combination of these techniques (see FIG. 6 for a key element of one such implementation).

Still referring to FIG. 5, note that in this embodiment the processor's standard cache 410 is used to store the encoded or obfuscated private-state data. When there is encoded content 510 to be delivered from either the cache 410 or memory 408, it may be decoded using a data decoding/encoding unit 524. The decoded content value 520 is then, in this embodiment, stored in the private-state area 516 of the processor. As before, cache 410 and memory 408 are publicly accessible (e.g., by the operating system), whereas the private-state area is only accessible to the inner workings of the processor. The data decoding/encoding unit 524 may also be used in reverse, when writing the private-state data in encoded form to storage. In such an embodiment, the unit 524 would encode a content value that may originate from the private-state area 516.

In some embodiments, special instructions may be provided in the processor's ISA for accessing some or all of the private-state data. These instructions when executed may result in the transfer of un-encoded data from the private-state area 516 (see FIG. 5), or they may dispatch special micro-operation or hardware control signals to access the region 418 in memory 408 (see FIG. 4) in which the private-state data is stored in encoded form. While other instructions of the ISA (e.g., normal load and store instructions) may be able to access the public regions of the memory 408 and/or the cache 410, the results of such read accesses will be private-state data values that have either their address values obfuscated and/or the data content encoded. Accordingly, without special hardware assistance, it may not be possible to reverse engineer or otherwise recover the private-state data in a timely fashion.

Although the above-described mechanism has logic components that are implemented inside a processor device, other organizations are possible in which some or all of the encoding logic is implemented in the system chipset, for example. In addition, special bus cycles may be defined for accessing the private-state region 418 of the memory 408 (FIG. 4).

Turning now to FIG. 6, a more detailed design of an example, programmable 4-bit, address bit obfuscation (encoding) mechanism is shown. This design may be used in the address obfuscation/encoding unit 514 of FIG. 5 and to generate the logical-to-physical address mapping (for the low-order bits) in FIG. 4.

The logic diagram of FIG. 6 is an embodiment of a combinational logic portion of a 4-bit wide, multi-input linear feedback shift register (MISR) with a fourth-order polynomial using the method described above. This combinational logic is fed by the polynomial control register 604, the optional mask register 610, and the input address source 606. Note that this logic is not an entire MISR, but does leverage the mapping properties of an MISR.

In FIG. 6, the polynomial control register 604 is loaded with the binary coefficients of a polynomial. For example, to configure the circuit of FIG. 6 to implement the logical-to-physical address mapping illustrated in FIG. 4 that maps with primitive polynomial $x^4+x^1+x^0$, one would load the polynomial control register 604 with binary coefficients $P_0=1$, $P_1=1$, $P_2=0$, $P_3=0$. The address bit vector 0000 will map to 0000, if the optional mask register 610 is set to 0000. The input address source 606 represents the 4-bit logical address to be encoded. The optional mask source 610 (e.g., control register) permits different mappings to be constructed.

As described above, the mask register 610 and polynomial control register 604 may be changed dynamically at run time. For example, the values that are loaded may be derived from a pseudo-random data source during power-on reset processing. This may thwart attempts to access private-state data or to circumvent any prescribed access methods (such as a special ISA instructions described above). FIG. 6 is an embodiment which is reasonably efficient and permits programmability with binary coefficient and mask values and a modest amount of hardware with relatively few gate delays. Other logic designs are possible for implementing the address obfuscation/encoding unit 514. Additional logic or content addressable memory (CAMs) may be used to further restrict the range of addresses modified by the address bit encoding mechanism. In addition, more complex logic may be designed for the encoding and decoding processes to, for example, strengthen the encoding (if needed).

The encoding of the content values of the private-state data may be accomplished in a way similar to those described above for address obfuscation. One approach is to XOR-in the logical address offsets (for aligned regions of private-state data), or XOR-in some constant seed value, with the contents of a given element of private-state to be encoded. A more sophisticated encoding mechanism may be used on a stream of private-state data values. A variant of a feedback shift register technique (linear, non-linear, multi-input, etc.) may be used with an initial seed. The initial seed is defined to be the initial state loaded into the feedback shift register. For each data value in succession, the shift register may be advanced and its contents bit-wise XOR-ed to the contents of the internal register. This is referred to as a Vigenre cipher and an example of this is shown in tables 470,480 of FIG. 4 above, where each unencoded content (data) value in 470 is zero (e.g., entry 471) but does not appear as such when stored in encoded form in 480 (e.g., entry 481) in memory 408. With this cipher, the shift register is used to generate a pseudo-random sequence of bit-wise XOR masks. In this case as each pseudo-random byte-wide mask is produced by an MISR (see 480), it is bit-wise XOR'ed with the next data value in the address sequence. Only the polynomial and initial shift register seed value is needed to regenerate the exact same sequence again. In an embodiment, the encode and/or decode unit's configuration information (e.g., polynomial and initial seed) could be stored along with the encoded state region in memory 408. To decode the private-state, the configuration information (e.g., polynomial and initial seed) would be retrieved (and possibly decoded using another fixed encoding technique), and then used. As long as each mask in the sequence is applied to the corresponding data in the same order (e.g., one mask applied per addressable data unit), the bit-wise XOR masking will produce (decode) the original data. As discussed previously, the polynomial and initial MISR seed values may be changed (e.g., boot time, run time, etc) using various methods or change constraints. To recover the original data, the decode method(s) appropriate for the encoding method(s) originally used should be applied, i.e. to undo the encoding. Vigenre ciphers are just one example of a private-state data value encoding mechanism, which is efficient and permits programmability with simple binary coefficient lists, seeds, etc., and a modest amount of hardware with only a few gate delays. Other embodiments are also possible.

In an embodiment of the invention, the processor may make use of the private-state region 132 in storage (see FIG. 1) at transitions between modes of operations of the processor. For example, the processor may access the private-state region when entering system management mode (SMM) as described above. These transitions between modes of operation are referred to herein as mode switches. Mode switches include, for example, movement between normal and system management mode, between a virtual machine (VM) and a virtual machine monitor (VMM) in a virtual machine system, between a user-level operating system process and the operating system kernel, etc.

In an embodiment of the invention, the processor may make use of the private-state region 132 in storage at any time after designation of the private-state region. For example, in a virtual machine system, the VMM may allocate a region in storage for the processor's use during virtual machine operation. The VMM may indicate the location of the private-state region to the processor (e.g., through executing an instruction defined in the ISA). After the processor receives this indication, it may be free to utilize the private-state region as it sees fit. For example, the processor may access the private-state region during transitions between a VM and the VMM (i.e., at mode switch points). Additionally, the processor may access the region during operation of a VM or the VMM. For example, the processor may access control information from the private-state region or the processor may store temporary values in the private-state region.

The ISA may also provide a mechanism by which the VMM may designate that a private-state region should no longer be used (e.g., by executing an instruction). In other embodiments, private-state regions may be designated using other methods. For example, a private-state region may be designated by writing to model-specific registers (MSRs), executing instructions in the ISA, writing to locations in storage, etc.

Although the above examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In the foregoing specification, the invention has been described with reference to various techniques for accessing data about the state of a data processing machine from publicly accessible storage. It will, however, be appreciated that various modifications and changes may be made thereto without departing from the broader spirit and scope of embodiments of the invention, as set forth in the appended claims. The specification and drawings are, accordingly, to be regarded in an illustrative rather than a restrictive sense.

What is claimed is:

1. A processor comprising:
   a storage element to store implementation-specific processor private-state data about an active task of the processor;
   encryption logic to encode said processor private-state data prior to storage in a publicly accessible private-state location;
   wherein the encryption logic comprises:
   an address generation unit (AGU) to receive a micro-operation instruction for writing said processor private-state data, and compute an address based upon the instruction;
   an address encoding unit to translate said address to point to said publicly accessible location; and
   decryption logic to decode said encoded processor private-state data after said encoded processor private-state data has been read from the publicly accessible location; and
   processor private-state data decoding hardware to decode said processor private-state data in response to an instruction for accessing the processor private-state data.

2. The processor of claim 1 wherein the decryption logic comprises:
an address decoding unit to translate back said translated address.

3. The processor of claim 1 further comprising:
a first cache to store said encoded processor private-state data; and
a second cache to store said decoded processor private-state data.

* * * * *